(12) United States Patent
Chang

(10) Patent No.: US 7,939,783 B2
(45) Date of Patent: May 10, 2011

(54) HAND-HELD ELECTRIC SEALER WITH DETACHABLE SEALING MODULE

(76) Inventor: Richard Chang, Hsi Chih (TW)

( * ) Notice: Subject to any disclaimer, the term of this patent is extended or adjusted under 35 U.S.C. 154(b) by 911 days.

(21) Appl. No.: 11/898,102

(22) Filed: Sep. 10, 2007

(65) Prior Publication Data

US 2009/0026190 A1 Jan. 29, 2009

(30) Foreign Application Priority Data

Jul. 25, 2007 (TW) ................ 96127131 A

(51) Int. Cl.
- *B30B 15/34* (2006.01)
- *B65B 7/00* (2006.01)
- *H05B 3/06* (2006.01)
- *H05B 3/16* (2006.01)

(52) U.S. Cl. ..... 219/243; 219/227; 156/579; 156/583.1; 156/583.9

(58) Field of Classification Search .................. None
See application file for complete search history.

(56) References Cited

U.S. PATENT DOCUMENTS

| | | | | |
|---|---|---|---|---|
| 3,253,122 A * | 5/1966 | Kochmer et al. | ............. | 219/243 |
| 3,912,575 A * | 10/1975 | Zelnick | ............. | 156/515 |
| 4,082,941 A * | 4/1978 | Sukow et al. | ............. | 219/243 |
| 4,104,108 A * | 8/1978 | Kishida et al. | ............. | 156/510 |
| 5,142,123 A * | 8/1992 | Chou | ............. | 219/243 |
| 5,854,466 A * | 12/1998 | Chou | ............. | 219/227 |
| 6,064,038 A * | 5/2000 | Chou et al. | ............. | 219/233 |
| 6,326,594 B1 * | 12/2001 | Chang et al. | ............. | 219/243 |
| 6,392,198 B1 * | 5/2002 | Yao | ............. | 219/243 |
| 6,450,088 B1 * | 9/2002 | Hutchinson | ............. | 100/320 |
| 6,770,849 B2 * | 8/2004 | Chou et al. | ............. | 219/243 |
| 6,933,470 B2 * | 8/2005 | Baptista | ............. | 219/243 |
| 6,998,577 B2 * | 2/2006 | Chou et al. | ............. | 219/243 |
| 7,034,252 B2 * | 4/2006 | Chang et al. | ............. | 219/243 |
| 7,315,010 B2 * | 1/2008 | Chou et al. | ............. | 219/243 |
| 7,700,897 B2 * | 4/2010 | Chou et al. | ............. | 219/243 |
| 7,759,611 B2 * | 7/2010 | Cheney et al. | ............. | 219/243 |
| 2002/0185484 A1 * | 12/2002 | Chang et al. | ............. | 219/243 |
| 2003/0019861 A1 * | 1/2003 | Chou et al. | ............. | 219/243 |
| 2004/0020913 A1 * | 2/2004 | Hovorka | ............. | 219/243 |
| 2004/0262281 A1 * | 12/2004 | Chou et al. | ............. | 219/243 |
| 2006/0113292 A1 * | 6/2006 | Chou et al. | ............. | 219/243 |
| 2006/0231211 A1 * | 10/2006 | Chou et al. | ............. | 156/579 |

* cited by examiner

*Primary Examiner* — Joseph M Pelham
(74) *Attorney, Agent, or Firm* — Bacon & Thomas, PLLC

(57) ABSTRACT

A hand-held electric sealer with a detachable sealing module includes a casing, a sealing module, and a press bar. The casing includes, among others, a front contact holder which is provided with an engagement hole. The sealing module includes, among others, a lower cover from underside of which extended an engagement piece. The engagement piece of the sealing module can be engaged with the engagement hole of the casing, such that the sealing module can be conveniently attached to, or detached from, the casing, and that replacement of a damaged sealing module can be readily achieved. In addition, for the sealing module dual heating wires may also be employed so as to obtain a desirable sealing effect to plastic bags.

10 Claims, 6 Drawing Sheets

HAND-HELD ELECTRIC SEALER WITH DETACHABLE SEALING MODULE

BACKGROUND OF THE INVENTION

1. Field of the Invention

The present invention relates to hand-held electric sealers, and more particularly, to a hand-held electric sealer with a detachable sealing module.

2. Description of Related Art

Hand-held electric sealers are commonly provided for sealing plastic bags of various sizes in which foods or goods not yet consumed are packed for storage so as to keep them from contamination. A conventional hand-held electric sealer, such as the one disclosed in U.S. Pat. No. 6,326,594, includes a casing, a sealing mechanism, a press bar, and a safety stop plate, wherein the sealing mechanism has a heating wire which produces heat for sealing plastic bags. Moreover, to facilitate replacing sealing mechanisms in electric sealers, instead of throwing away the whole sealers when, for instance, heating wires are damaged, U.S. Patent Application Publication No. 2004/0262281 discloses an electric sealer with a modulized sealing mechanism. Such modulized sealing mechanism or sealing module can be attached to, or detached from the electric sealer through a coupling arrangement, so that the sealing module can be easily replaced when damaged.

SUMMARY OF THE INVENTION

An object of the present invention is to provide a hand-held electric sealer with a detachable sealing module having an engagement structure to be conveniently attached to, or detached from a casing of the electric sealer.

According to the present invention, the hand-held electric sealer with a detachable sealing module comprises a casing, a sealing module, and a press bar. The casing includes a front chamber, a front contact holder, a rear contact holder, and a battery chamber. The front contact holder is provided with an engagement hole. The battery chamber is arranged with two front contacts and a rear contact, where the front contacts are disposed at the front contact holder and the rear contact is disposed at the rear contact holder. The casing further includes a battery cover covered on the battery chamber, and a rear cover on the rear end of the casing. The rear cover has a switching hole for passing therethrough a spring switch.

In the present invention, the sealing module includes a lower cover, an upper cover, a heat insulation base interposed between the lower cover and the upper cover, a heating wire, a heat resistant cover sheet, and two locating means. The lower cover is provided with two slots. The heating wire is laid over the heat insulation base, where the locating means secure the heating wire at both sides of the heat insulation base, and the locating means pass through the slots of the lower cover for electric connection with the front contacts in the battery chamber. An engagement piece is provided underside of the lower cover and can be engaged with the engagement hole of the casing, such that the sealing module can be fixed in the front chamber of the casing. The engagement piece is provided underneath a slot so that the end of the engagement piece can be resiliently converged or recovered and be firmly held in the engagement hole.

A press bar is arranged above the casing and includes a heat insulation block, a heat resistant cover sheet, and two pivot pins. The heat resistant cover sheet is wrapped over the heat insulation block, while the pivot pins are received in pivot holes of the casing. Upon pressing the press bar downward on the sealing module, the press bar actuates the spring switch and causes contact of the heating wire of the sealing module with battery power source, so that the heating wire is heated for sealing plastic bags.

Further, according to the present invention, a blade module is disposed at the underside of, and the front end of, the casing, where the blade module is pivotally fixed to the casing. The blade module has a seam in which a blade is inserted, such that the blade is fixed inside of the blade module and communicates to the seam. A rubber magnet is fixed to the underside of, and at the rear end of, the casing so that the electric sealer can be positioned at, and easily reached from, an appropriate site.

According to the present invention, through engagement of the engagement piece of the sealing module and the engagement hole of the casing, the sealing module can be conveniently attached to, or detached from, the casing, without the help of any extra tool, and that replacement of a damaged sealing module can be readily achieved.

In addition, dual heating wires may also be employed to replace the single heating wire, so that in order to strengthen a sealing effect to the plastic bags, or when thicker plastic bags are to be sealed, a sealing module with the dual heating wires may be a better choice.

DETAILED DESCRIPTION OF THE PREFERRED EMBODIMENTS

Figure 1:
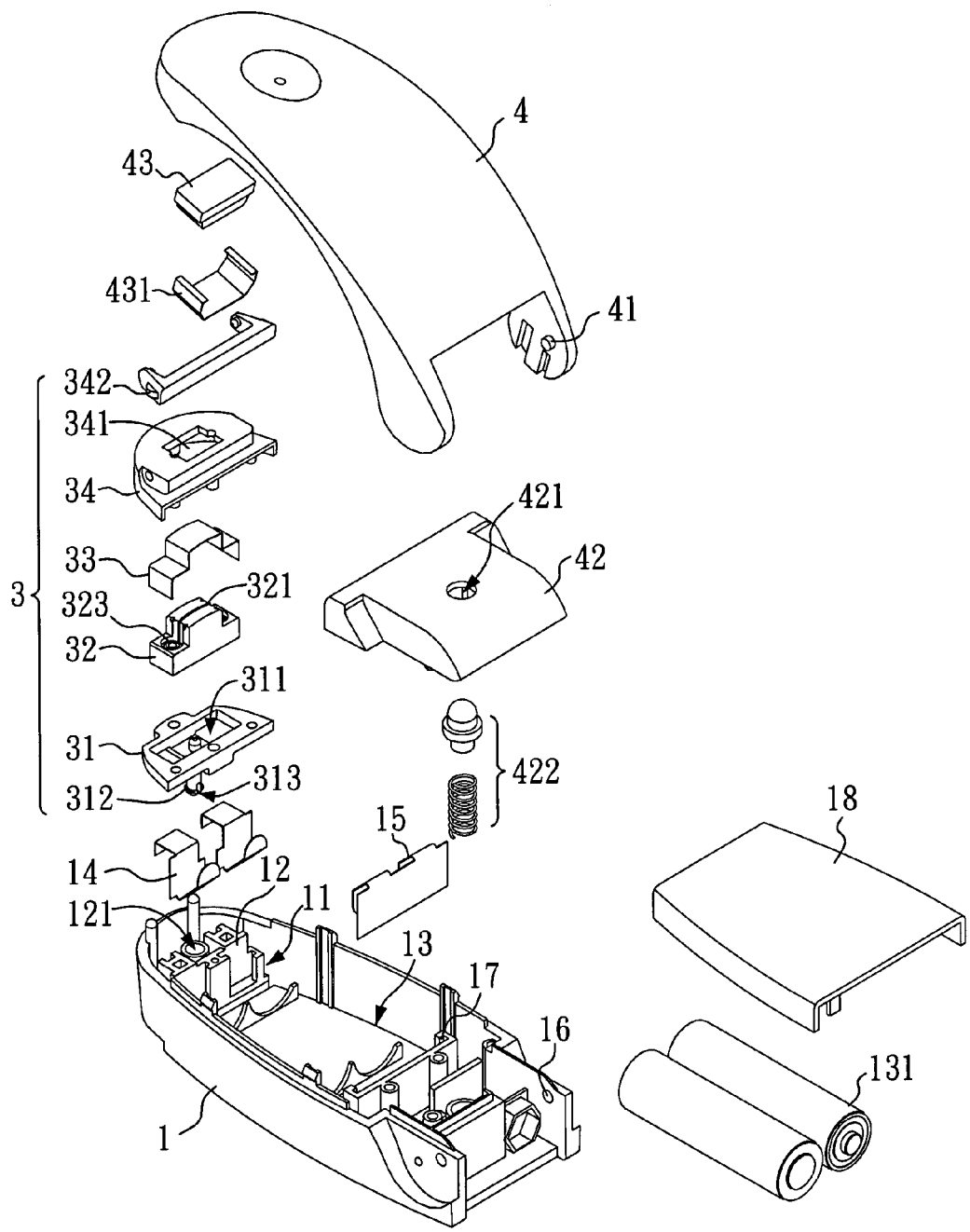
FIG. 1 shows an explosion view of a hand-held electric sealer with a disassembled sealing module according to a first embodiment of the present invention.
Figure 2:
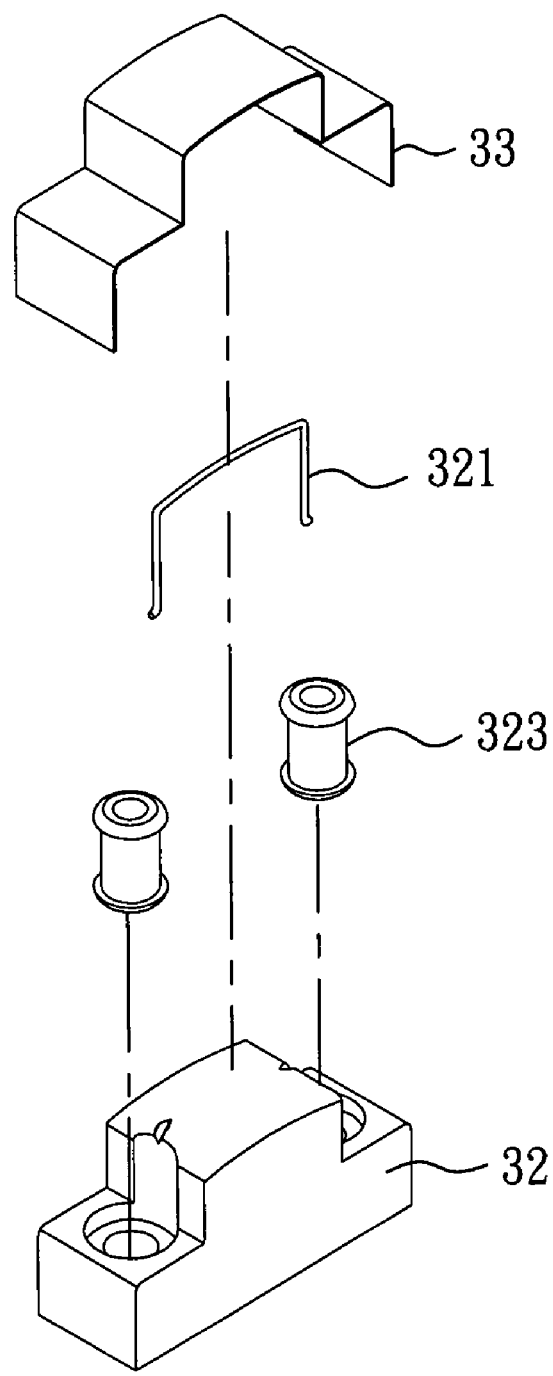
FIG. 2 shows an explosion view of part of the sealing module according to the first embodiment of the present invention.

Referring to FIGS. 1 and 2, a hand-held electric sealer with a detachable sealing module according to a first embodiment of the present invention comprises a casing 1, a sealing module 3, and a press bar 4. The casing 1 includes a front chamber 11, a front contact holder 12 having an engagement hole 121, a rear contact holder 17, a battery chamber 13 arranged with two front contacts 14 and a rear contact 15, and two pivot holes 16. The front contacts 14 are disposed at the front contact holder 12 and the rear contact 15 at the rear contact holder 17. A batter cover 18 is covered on the battery chamber 13, and a rear cover 42 on the rear end of the casing 1. The rear cover 42 has a switching hole 421 and a spring switch 422 passing through the switching hole 421.

The press bar 4 is arranged above the casing 1 and includes a heat insulation block 43, a heat resistant cover sheet 431, and two pivot pins 41. The heat resistant cover sheet 431 is wrapped over the heat insulation block 43, while the two pivot pins 41 are received in the two pivot holes 16 of the casing 1, so that the press bar 4 is pivotally connected with the casing 1. Upon pressing the press bar 4 downward on the sealing module 3, the press bar 4 will actuate the spring switch 422 and cause contact of a heating wire 321 of the sealing module 3 with battery power source 131, so that the heating wire 321 is heated for sealing plastic bags.

The sealing module 3 includes a lower cover 31, a heat insulation base 32, the heating wire 321, a heat resistant cover sheet 33, an upper cover 34, and two locating means 323. The lower cover 31 is provided with two slots 311. The heating wire 321 is laid over the heat insulation base 32, where the locating means 323 secure the heating wire 321 at both sides of the heat insulation base 32, and the locating means 323 pass through the slots 311 of the lower cover 31 for electric connection with the front contacts 14 in the battery chamber 13. The heat resistant cover sheet 33 is laid over the heat insulation base 32 and the heating wire 321.

Further, as shown in FIG. 1, in the sealing module 3 an opening 341 is provided at the upper surface of the upper cover 34, such that the heat resistant cover sheet 33, the heating wire 321, and the heat insulation base 32, after assembly thereof, are passed through the opening 341, extending outward of the upper surface of the upper cover 34, and interposed between the upper cover 34 and the lower cover 31. A safety stop plate 342 is pivotally connected at both sides of the upper cover 34 and can be turned to a predetermined position above the heating wire 321, as a protection from an unintentional pushing downward of the press bar 4 and actuation of the heating wire 321.

Figure 3A:
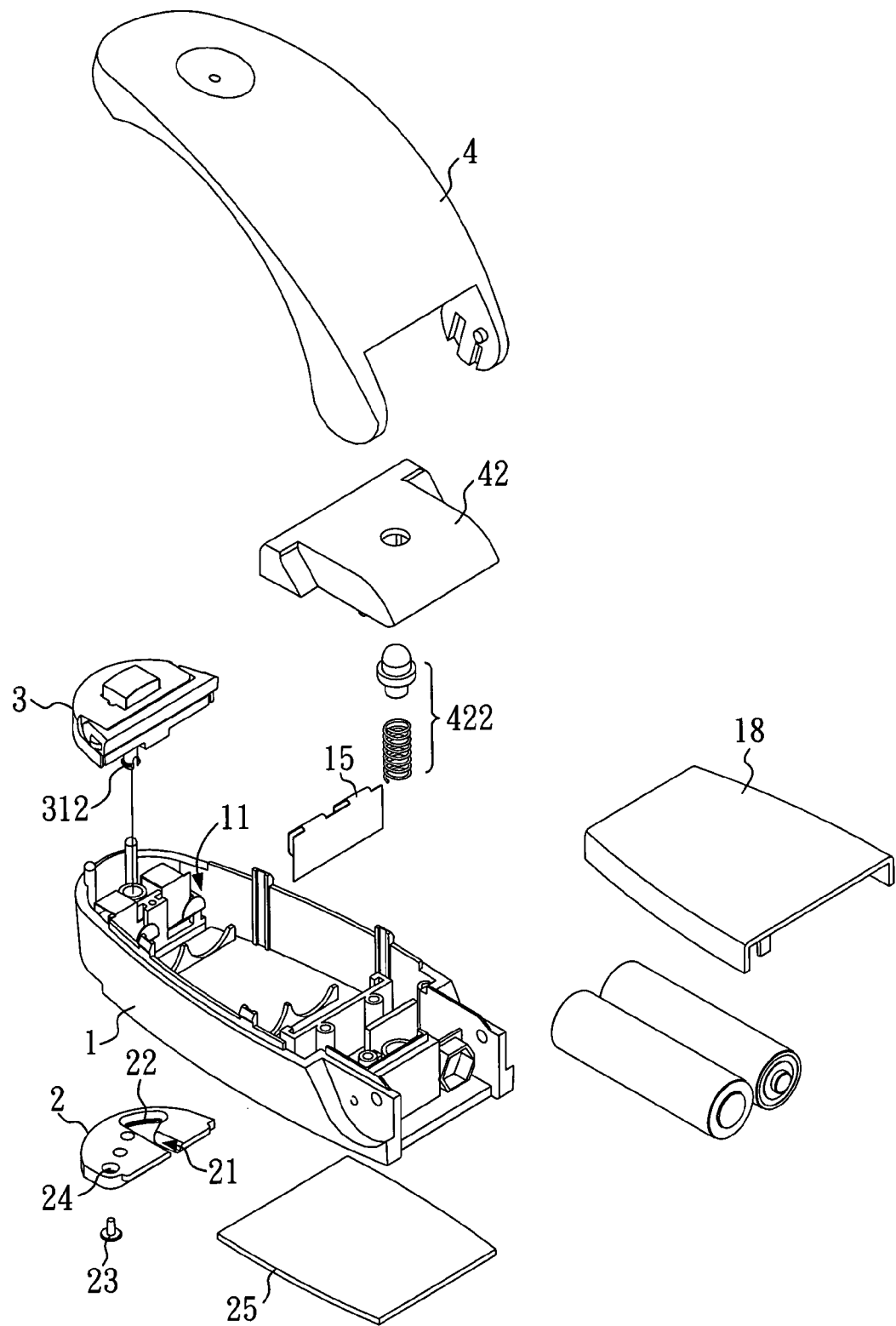
FIG. 3A shows an explosion view of the hand-held electric sealer with an assembled sealing module according to the first embodiment of the present invention.
Figure 3B:
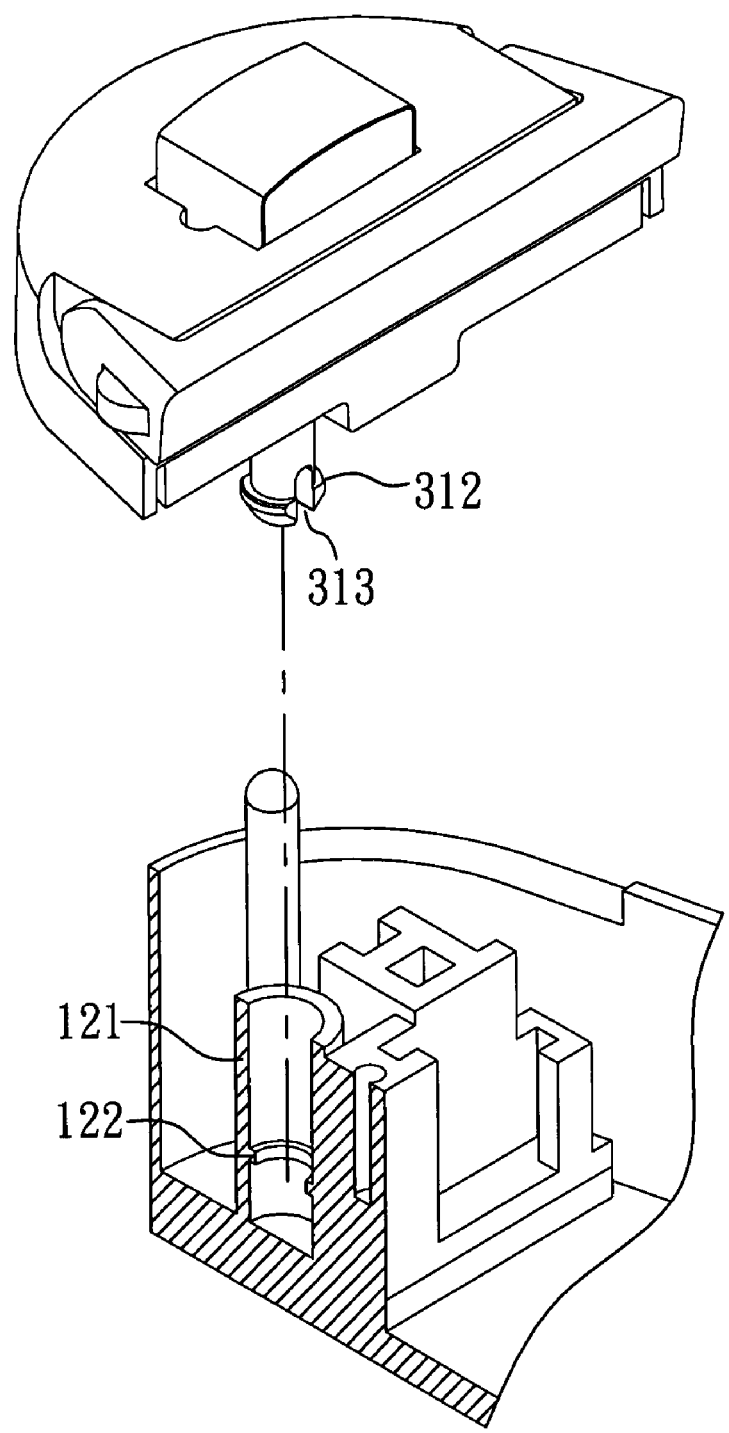
FIG. 3B shows an explosion view of part of the hand-held electric sealer with the assembled sealing module detached from the sealer according to the first embodiment of the present invention.

Referring to FIG. 3A, an explosion view of the hand-held electric sealer, with the sealing module 3 assembled, according to the first embodiment of the present invention, the sealing module 3 has an engagement piece 312 extending from underside of the lower cover 31 and engaged with the engagement hole 121 of the casing 1, such that the sealing module 3 can be held in the front chamber 11 of the casing 1. Further referring to FIG. 3B, an explosion view of part of the hand-held electric sealer with the assembled sealing module 3 detached from the sealer, the engagement piece 312 is provided underneath with a slot 313 so that the end of the engagement piece 312 can be resiliently converged or recovered. In other words, when the engagement piece 312 is engaged with the engagement hole 121, the slot 313 allows the end of the engagement piece 312 to be converged; and after the engagement piece 312 is completely engaged with the slot 313, the end of the engagement piece 312 is recovered. A ring 122 is retained in the engagement hole 121, so that the engagement piece 312 can be firmly held by the ring 122 in the engagement hole 121. As a result, the sealing module 3, through the engagement piece 312 and the engagement hole 121, can be conveniently attached to, or detached from, the casing 1, without the help of any extra tool, and that replacement of a damaged sealing module can be readily achieved.

Again, as shown in FIG. 3A, a blade module 2 is disposed underside of, and at the front end of, the casing 1, where the blade module 2 is pivotally fixed to the casing 1 by, for instance, a fixing means such as a rivet 23 passing through a hole 24 in the blade module 2. The blade module 2 has a seam 21 in which a blade 22 is inserted, where the blade 22 is fixed inside of the blade module 2 and communicates to the seam 21, such that the previous sealing of a plastic bag can be cut off by passing the sealing through the seam 21 and cut by the blade 22. A rubber magnet 25 is fixed to the underside of, and at the rear end of, the casing 1 so that the electric sealer can be positioned at, and easily reached from, an appropriate site, such as the exterior of a refrigerator.

Figure 4:
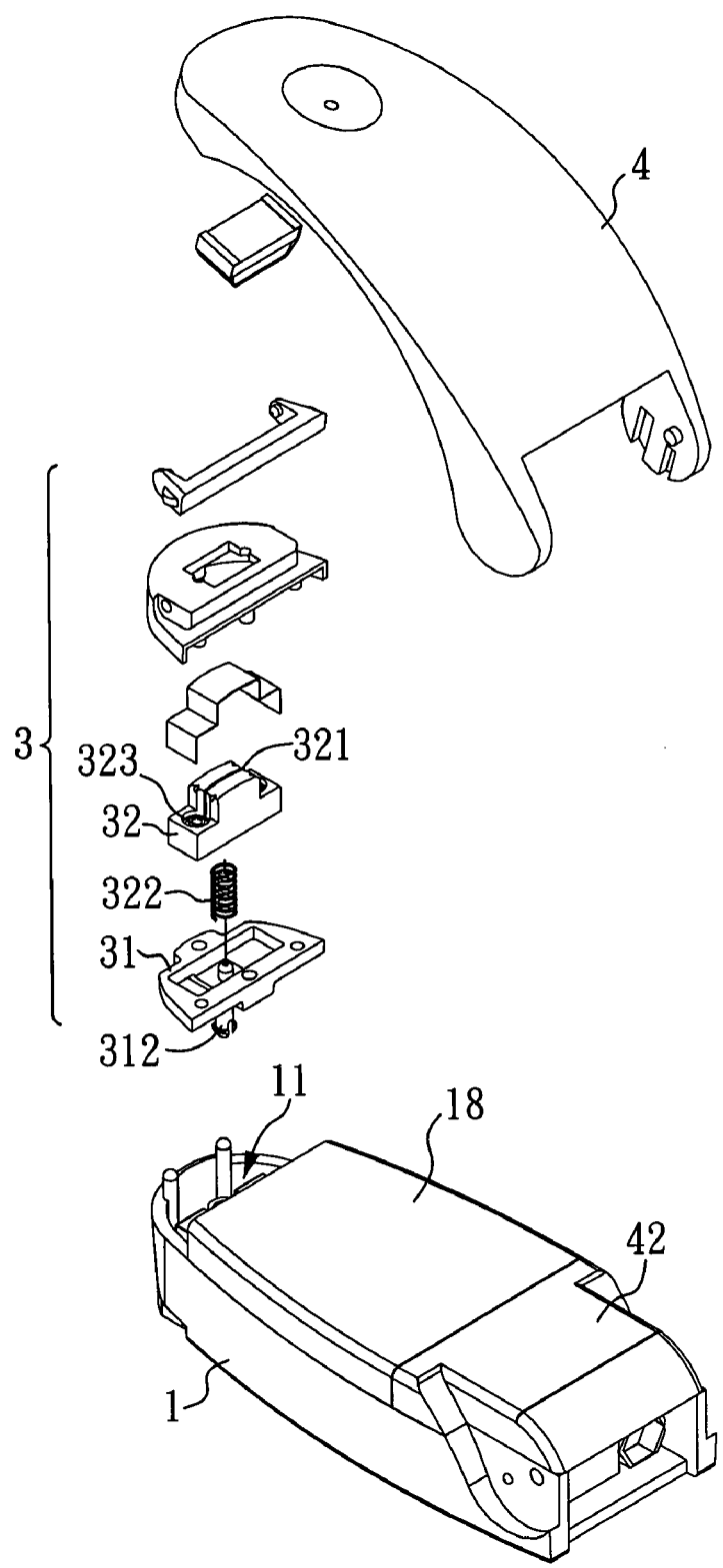
FIG. 4 shows an explosion view of a hand-held electric sealer with a disassembled sealing module according to a second embodiment of the present invention.

Now referring to FIG. 4, an explosion view of a hand-held electric sealer with a disassembled sealing module according to a second embodiment of the present invention, the structure of the second embodiment is similar to that of the first embodiment except that the spring switch 422 is replaced with a spring 322 interposed between the heat insulation base 32 and the lower cover 31. In a normal state, the spring 322 biases against the heat insulation base 32 and the lower cover 31, so that the locating means 323 are kept from electrically contacting the two front contacts 14. However, when the press bar 4 is pressed down and the heat insulation block 43 presses on the heat insulation base 32, the locating means 323 will pass through the two slots 311 of the lower cover 31 and are electrically connected with the two front contacts 14 in the battery chamber 13.

Therefore, it is understood that, according to the present invention, the sealing module 3 can be actuated, and thus plastic bags be sealed, by pressing down the press bar 4 and making the heat insulation block 43 overcome the bias of the spring 322, so that the locating means 323 can be electrically connected with the two front contacts 14; or by pressing down the press bar 4 and actuating the spring switch 422 at the rear end of the casing 1 as mentioned above.

Figure 5:
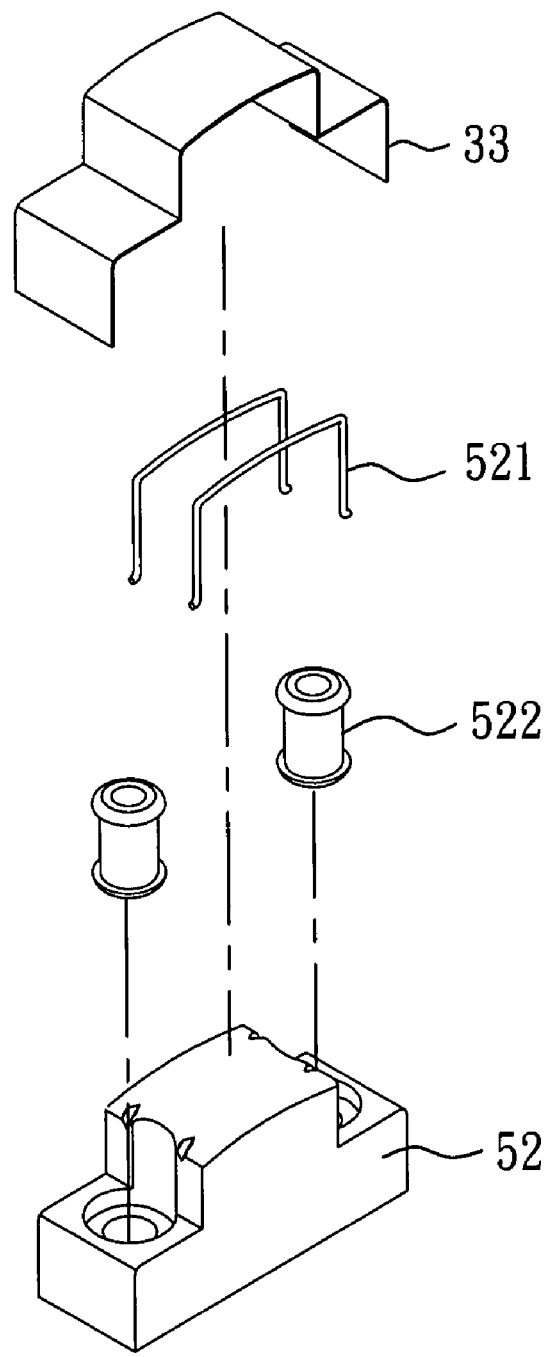
FIG. 5 shows an explosion view of part of a sealing module according to a third embodiment of the present invention.

Further, referring to FIG. 5, an explosion view of part of a sealing module according to a third embodiment of the present invention, dual heating wires 521 are laid over a heat insulation base 52, with two locating means 522 positioning the dual heating wires 521 at both sides of the heat insulation base 52. The dual heating wires 521 may also be employed in the first and the second embodiments to replace the single heating wire 321, so that in order to strengthen a sealing effect to the plastic bags, or when thicker plastic bags are to be sealed, a sealing module with the dual heating wires 521 may be a better choice.

Although the present invention has been explained in relation to its preferred embodiments, it is to be understood that many other possible modifications and variations can be made without departing from the scope of the invention as hereinafter claimed.

What is claimed is:

1. A hand-held electric sealer with a detachable sealing module, comprising:
   a casing, including a front chamber disposed at a front portion of the casing, a front contact holder disposed at the front portion of the casing and having an engagement hole formed therein, a rear contact holder disposed at a rear portion of the casing, a battery chamber arranged with two front contacts and a rear contact, where the front contacts are disposed at the front contact holder and the rear contact at the rear contact holder;
   a sealing module, including a lower cover, an upper cover, a heat insulation base interposed between the lower cover and the upper cover, at least one heating wire laid over the heat insulation base, and two locating means for securing the heating wire at two side portions of the heat insulation base, the lower cover having two slots such that the locating means passes through the slots for electric connection with the front contacts in the battery chamber;
   a spring interposed between the heat insulation base and the lower cover for allowing the locating means to move relative to the lower cover to selectively engage the front contacts;
   an engagement piece extending from an underside of the lower cover and selectively engaged with the engagement hole of the front contact holder of the casing such that the sealing module can be detachably held in the front chamber of the casing, the engagement piece having a slot formed therein, wherein a ring is disposed in the engagement hole such that the engagement piece is held in the engagement hole by the ring; and a press bar, arranged above and pivotally connected with the casing and including a heat insulation block.

2. The hand-held electric sealer with a detachable sealing module as claimed in claim 1, wherein the sealing module further includes a heat resistant cover sheet laid over the heat insulation base.

3. The hand-held electric sealer with a detachable sealing module as claimed in claim 1, wherein in the sealing module an opening is provided at the upper surface of the upper cover, and a safety stop plate is pivotally connected at both sides of the upper cover.

4. The hand-held electric sealer with a detachable sealing module as claimed in claim 1, wherein the casing further includes a battery cover covered on the battery chamber, and a rear cover covered on a rear end of the casing.

5. The hand-held electric sealer with a detachable sealing module as claimed in claim 1, further comprising a blade module disposed underside of the casing and pivotally fixed to the casing by a fixing means.

6. The hand-held electric sealer with a detachable sealing module as claimed in claim 5, further comprising a rubber magnet fixed to the underside of the casing and neighboring the blade module.

7. The hand-held electric sealer with a detachable sealing module as claimed in claim 1, further comprising a blade module disposed underside, and at the front end of the casing and pivotally fixed to the casing by a fixing means; and a rubber magnet fixed to the underside of, and at the rear end of the casing.

8. The hand-held electric sealer with a detachable sealing module as claimed in claim 7, wherein the blade module includes a seam in which a blade is inserted, where the blade is fixed inside of the blade module and communicates to the seam.

9. The hand-held electric sealer with a detachable sealing module as claimed in claim 1, wherein the press bar further includes a heat resistant cover sheet wrapped over the heat insulation block.

10. The hand-held electric sealer with a detachable sealing module as claimed in claim 1, wherein the press bar is pivotally connected with the casing in such a manner that two pivot pins of the press bar are received in two pivot holes of the casing.

* * * * *